ROBERT E. SANCTUARY
INVENTOR.

United States Patent Office 3,348,805
Patented Oct. 24, 1967

3,348,805
BALL VALVE
Robert E. Sanctuary, Shrewsbury, Mass., assignor to Worcester Valve Co., Inc., Worcester, Mass., a corporation of Massachusetts
Filed Sept. 8, 1964, Ser. No. 394,975
12 Claims. (Cl. 251—315)

This invention relates to a ball valve and, more particularly, to apparatus arranged to control the flow of material in a fluid system.

In the design and manufacture of ball valves, there are many problems which, in the past, have been difficult to overcome. It is necessary in a conventional ball valve, for instance, to make the ball with an accurate geometric shape and with a smooth finish. This is because of the fact that the ball must engage seals, particularly in the shut-off position, so that there will be no leakage, undercutting of the seals, or the like. Furthermore, the conventional seal, which is located in the body, is composed of many separate parts necessitated by the fact that it must not only engage the ball with a tight, leak-proof connection, but there must be assurance that no leakage takes place around the outside of the seal. The use of such seals in the body and the necessity for extreme accuracy in the ball shape and finish, means that ball valves in the past have been quite expensive to manufacture and many applications have been prohibited (despite their many advantages) because of their cost being greater than other types of valves. These and other difficulties experienced with the prior art devices have been obviated in a novel manner by the present invention.

It is, therefore, an outstanding object of the invention to provide a ball valve which is inexpensive to manufacture, rugged in construction, and which is capable of a long life of useful service with a minimum of maintenance.

Another object of this invention is the provision of a ball valve in which the geometry of the ball need not be maintained with extreme accuracy but in which the effective operation of the valve is not inhibited.

A further object of the present invention is the provision of a ball valve having sealing on both sides of the ball during shut-off but requiring only one removable seat.

It is another object of the instant invention to provide a ball valve having a novel sealing construction which renders the valve inexpensive to manufacture.

It is a further object of the invention to provide a ball valve on which the sealing means is integral with the ball and which is capable, therefore, of being used with an inexpensive, simple seat construction.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

Figure 1:
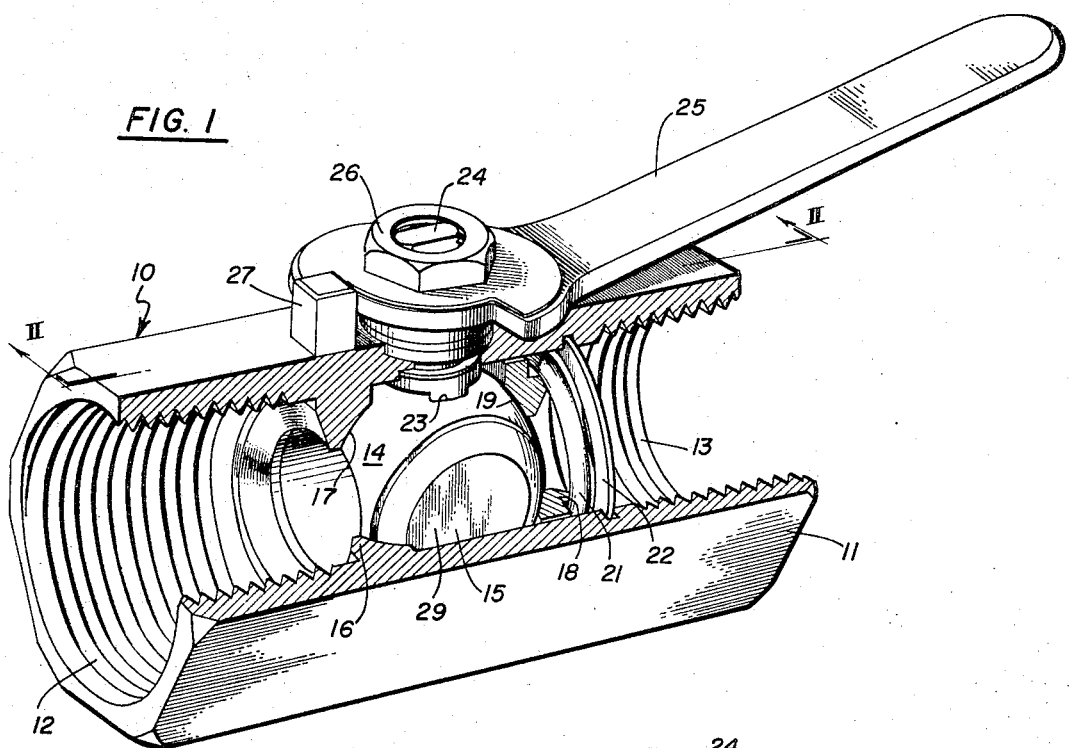
FIG. 1 is a perspective view of a ball valve embodying the principles of the present invention.

Referring first to FIG. 1, which best shows the general features of the invention, it can be seen that the ball valve, indicated generally by the reference numeral 10, is provided with a body 11 formed of forging brass and provided with threaded inlet passage 12 an a threaded outlet passage 13. The inlet an outlet passages extend toward the ends of the elongated body 11 from a central chamber 14. In the chamber is located a generally spherical ball 15 formed of a plastic material, such as an acetal resin, having high wearing properties but possessing adequate resilience. Such a plastic material could be the acetal resin manufactured by Du Pont Corporation, known as "Delrin," but any suitable plastic material may be used which has metal-like properties, including high strength and rigidity, good abrasion resistance, excellent dimensional stability, and resistance to moisture, resilience and toughness. In this case, the plastic selected should retain these properties over a wide range of temperature, humidity, exposure to solvents and many other chemicals, and also through extended high loading and prolonged cyclic stressing. Between the chamber 14 and the inlet passage 12 extends a radial flange 16 having a conical surface or seat 17 directed toward the ball 15. At the junction between the outlet passage 13 and the chamber 14 is provided a ring 18 having a conical surface or seat 19 directed toward the ball. The ring is provided with a sealing rubber O-ring 21 and is locked in place by a locking ring 22.

The top of the ball 15 is provided with a recess 23 in which is located the lower end of a vertical stem 24. The stem is provided in the usual way with washers and springs and with a handle 25 all assembled on the stem and held in place by a nut 26. The handle is provided with a notch in the usual way which engages an abutment 27 on the top of the body 11 which notch and nut determine the extreme positions of the ball in rotating about a vertical axis.

Figure 3:
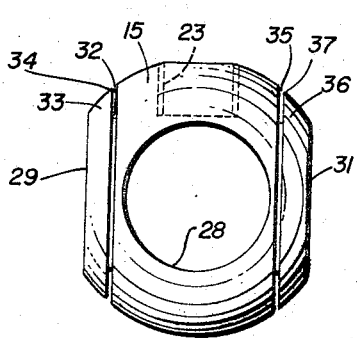
FIG. 3 is an end view of a portion of the valve observed in the direction of the line III—III of FIG. 2.

The ball 15 is shown in detail in FIG. 3. The recess 23 extends downwardly into its upper portion and a bore 28 extends entirely through the ball. This bore is of the same size as the inner diameter of the flange 16 and the inner diameter of the ring 18 to provide a continuous passage when the valve is open. The ball 15 is provided at positions 90° away from the centerline of the bore 28 with flat surfaces 29 and 31, the surfaces extending in planes at right angles to a line extending at a right angle to the centerline of the bore 28 at the exact center thereof. Parallel to and slightly spaced from the flat surface 29 is an annular recess 32 extending into the ball 15 parallel to the plane of the surface 29. The recess 32 delineates a sealing means, such as a lip or flange 33, which, because of the nature of the plastic material from which the ball 15 is formed, has a degree of resiliency, particularly at the edge 34 between the spherical surface of the ball 15 and the recess 32. Similarly, an annular recess 35 is provided which is spaced from and parallel to the plane of the flat surface 31 to define a sealing means, such as a lip or flange 36, having a thin edge 37 at the intersection between the recess 35 and the surface of the ball.

Figure 2:
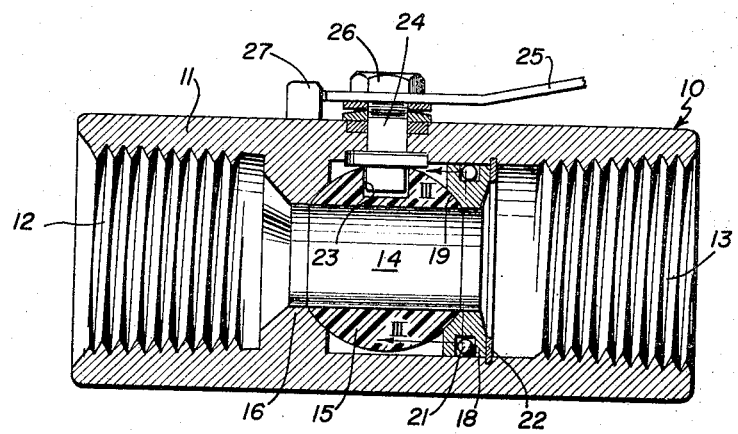
FIG. 2 is a vertical sectional view of the invention taken on the line II—II of FIG. 1.

The operation of the invention will now be readily understood in view of the above description. To begin with, the assembly of the valve is of interest because the ball 15 can be placed in the chamber 14 when the ring 18 and associated elements are removed. Then, the ring is slid into place with its O-ring 21 and locked in place against the ball by means of the locking ring 22. The stem 24 is inserted through a suitable aperture in the top of the body 11 and, after the placement of various washers, springs, and the handle 25, is locked in place by means of the nut 26. In one extreme position of rotation of the handle and the stem 24, the bore 28 of the ball 15 is aligned with the centerline of the inlet passage 12 and the outlet passage 13. The ball then appears as shown in FIGS. 1 and 2. In the other extreme position, the bore 28 extends at a right angle to the passages 12 and 13; the flat surface 29 faces toward the inlet passage 12, while the flat surface 31 faces toward the outlet passage 13. In that condition, the edge 34 of the flange 33 contacts the seat 17 which is part of the flange 16. At the same time, the edge 37 of the flange 36 contacts the seat 19 formed on the ring 18. The position of the locking ring 22 is selected so that, in this condition, the flanges 33 and 36 are bent slightly toward the center of the ball by the pressure of the seats 17 and 19. This provides a tight seal and prevents leakage of fluid through the valve when it is in this closed condition. By selecting the plastic material properly, and by selecting the cross-sectional thickness of the flange 33, it is possible to obtain exactly the right resilience to insure good sealing at these points.

It can be seen, then, that the present ball valve has a number of advantages. The pair of annular grooves in the ball operate in conjunction with the natural resilient properties of the plastic material to provide a positive closure. In effect, the ball itself has its own reilient seats, unlike conventional ball valves, which depend on separate seats to maintain positive shut-off. The fact that the body construction is unitized insures that there is no possibility of body leaks. Since one of the dual seats is integral with the body and is simple in construction, the cost of the valve is reduced considerably because there is no necessity for providing for two sets of removable seats with their sealing means and locking rings. Furthermore, the ball can be made by the injection molding process, whereby a smooth, geometrically-accurate surface can be obtained at a minimum of cost. The plastic material, of course, can be selected to be impervious to chemical attack and so forth.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A ball valve, comprising
   (a) a body having an inlet passage and an outlet passage,
   (b) a generally spherical ball mounted in the body between the passages and having a bore extending therethrough for connecting the passages on occasion,
   (c) seats formed in the body on opposite sides of the ball adjacent the passages, and
   (d) resilient seal means located on opposite sides of the ball and engageable with the said seats when the ball is positioned so that the bore does not connect the passages, said seal means comprising a pair of annular surfaces formed as integral portions of said ball and demarked from the remainder of said ball by a pair of annular grooves respectively.

2. A ball valve, comprising
   (a) an elongated body having a central chamber and having aligned inlet and outlet passages extending from the chamber to the ends of the body,
   (b) a generally spherical ball located in the chamber and rotatable about an axis perpendicular to the said passages, the ball having a bore which is aligned with and connects the passages in a first position of rotation of the ball and which does not connect the passages in a second position,
   (c) seats located at the junction of the passages with the chamber and facing the ball for contact therewith, and
   (d) resilient seal means provided on the ball for contact with the seats when the ball is in the second position, said seal means being formed of the same material as said ball and comprising a pair of resilient flanges integral with said ball.

3. A ball valve as recited in claim 2, wherein each of the said resilient flanges consists of a circular flange whose outer edge engages a seat.

4. A ball valve as recited in claim 3, wherein each of said flanges is defined by a recess in the ball extending inwardly of its surface radially and perpendicularly of a line extending at a right angle to the centerline of the bore at the center of the bore.

5. A ball valve as recited in claim 2, wherein said ball and said flanges are made of a plastic material.

6. A ball valve as recited in claim 5, wherein the plastic material is an acetal resin.

7. A ball valve, comprising
   (a) a body having an inlet passage and an outlet passage,
   (b) a generally spherical ball formed of a hard resilient plastic material mounted in the body between the passages and having a bore extending therethrough for connecting the passages on occasion,
   (c) seats formed in the body on opposite sides of the ball adjacent the passages, and
   (d) an annular flange having a thin resilient lip located on each side of the ball and engageable with the said seats when the ball is positioned so that the bore does not connect the passages, each of said flanges being formed of said hard resilient plastic material and being attached to said ball.

8. In a ball valve of the type comprising a body having an inlet passage and an outlet passage, seat means carried by said body adjacent at leats one of said passages, and a generally spherical ball mounted in the body between the passages and having a bore extending therethrough, said ball being rotatable to effect selective alignment of said bore with said passages, the improvement which comprises resilient seal means formed as an integral portion of said ball and adapted to engage said seat means when said bore is positioned transverse to said passages to block fluid flow through said body in the closed position of said valve, said resilient seal means comprising an annular sealing surface demarked from the main body of said ball by an annular slot.

9. The structure of claim 8 wherein said ball and resilient seal means are formed of molded plastic material.

10. The structure of claim 8 wherein said seat means comprises a pair of seats disposed adjacent said inlet and outlet passages respectively, said resilient seal means comprising a pair of annular surfaces demarked from the main body of said ball by a pair of annular slots respectively, said pair of annular sealing surfaces being spaced from one another on opposite sides of said ball.

11. In a valve, of the type comprising a valve body having an inlet passage and an outlet passage, a generally spherical ball rotatably mounted in the body between the passages and having a bore extending therethrough for connecting the passages in one rotational position of the ball and for isolating the passages in another rotational position, and a pair of seats in the body positioned adjacent the inlet passage and outlet passage respectively, the improvemnet which comprises sealing means carried by the ball for engaging the seats, said sealing means being integral with the ball and being made of the same material as the ball, the ball having a pair of flat surfaces on opposite sides thereof extending in parallel relation to one another and in parallel relation to the center line of the ball, the sealing means being formed as a pair of annular flanges located adjacent said pair of flat surfaces respectively and demarked from the remainder of the ball by a pair of annular slots recessed into said ball in planes parallel to and spaced from said pair of flat surfaces so as to define resilient flange edges positioned closely adjacent said slots for engaging said pair of seats respectively to seal the valve adjacent both the inlet and outlet passages when the passages are to be isolated from one another.

12. The structure of claim 11 wherein said ball and its integral sealing means are both formed of a molded plastic material.

References Cited

UNITED STATES PATENTS

| | | | |
|---|---|---|---|
| 3,057,370 | 10/1962 | Hamilton | 251—368 X |
| 3,132,836 | 5/1964 | Dickerson | 251—368 X |
| 3,155,368 | 11/1964 | Shafer | 251—315 X |
| 3,198,477 | 8/1965 | Allenbaugh | 251—315 X |

FOREIGN PATENTS

| | | |
|---|---|---|
| 98,087 | 10/1924 | Austria. |

M. CARY NELSON, *Primary Examiner.*

M. O. STURM, *Assistant Examiner.*